United States Patent [19]

Kuwano et al.

[11] Patent Number: 5,262,695
[45] Date of Patent: Nov. 16, 1993

[54] MICROMACHINE

[75] Inventors: Yukinori Kuwano, Katano; Masato Nishikuni, Hirakata; Shigeru Noguchi, Hirakata; Makoto Tanaka, Hirakata; Hiroyuki Kuriyama, Minoo; Akira Terakawa, Nara; Noboru Nakamura, Uji; Shinya Tsuda, Tsuzuki; Takeo Tsutsumi, Moriguchi; Hiroaki Izu, Hirakata; Yukio Nakashima, Hirakata, all of Japan

[73] Assignee: Sanyo Electric Co., Ltd., Osaka, Japan

[21] Appl. No.: 823,459

[22] Filed: Jan. 22, 1992

[30] Foreign Application Priority Data

Jan. 24, 1991 [JP] Japan .................................. 3-7243
Jan. 30, 1991 [JP] Japan .................................. 3-10182
Feb. 15, 1991 [JP] Japan .................................. 3-22148

[51] Int. Cl.⁵ ........................ H01L 41/08; H02N 1/00
[52] U.S. Cl. ............................. 310/309; 310/40 MM; 310/DIG. 6
[58] Field of Search ................ 310/40 MM, 40.5, 308, 310/309, DIG. 6

[56] References Cited

U.S. PATENT DOCUMENTS 3,629,624 12/1971 Staudte ..................... 310/6
4,087,735 5/1978 O'Hare ..................... 322/2 A
4,943,750 7/1990 Howe et al. ............... 310/309
5,001,381 3/1991 Watanabe .................. 310/309
5,043,043 8/1991 Howe et al. ............... 156/645

FOREIGN PATENT DOCUMENTS 0161879 7/1988 Japan ..................... 310/309
0114871 4/1990 Japan ..................... 310/308

OTHER PUBLICATIONS

"Design Parameters for Compound-cone Concentrators Employing Spherical Receivers", Hamadto et al., Solar Energy vol. 36, No. 1, pp. 93-96, 1986.

"Solar Flux Enhancement on a Tilted Surface by a Vertical South Wall", Jalayerian et al., Solar Energy, vol. 36, No. 5, pp. 437-441, 1986.

"An Easy-to-Handle Solar Radiance Meter", Louat et al., Solar Energy vol. 37, No. 5, pp. 389-391, 1986.

"Velocity Measurement by the Laser Speckle Method Using Optical Fibers", B. Ruth, Optics and Laser Technology vol. 19, No. 2, Apr. 1987.

"Prospects for IC-Based Micro Electromechanical Devices", Kaigham J. Gabriel, Journal of Japan Robot Society, vol. 8, No. 4, Aug. 1990, pp. 63-68.

Primary Examiner—Emanuel T. Voeltz
Assistant Examiner—O. R. Haszko
Attorney, Agent, or Firm—Armstrong, Westerman, Hattori, McLeland & Naughton

[57] ABSTRACT

An electrostatic motor for use as a power generating mechanism to be mounted on a micromachine includes a rotatable semiconductor substrate and a drive electrode disposed in proximity to the substrate. The semiconductor substrate is doped with a specified impurity element to form electromagnetic wave-static electric converters of p-n junction. When the motor is to be started, the converter in the vicinity of the electrode is irradiated with electromagnetic waves to set up an electric field between the opposed surfaces of the converter and the electrode to rotate the substrate by an electrostatic force due to the electric field.

14 Claims, 7 Drawing Sheets

MICROMACHINE

FIELD OF THE INVENTION

The present invention relates to minute machines which are several millimeters or smaller in size, and more particularly to micromachines to which electromagnetic waves are supplied from outside as the energy source thereof.

BACKGROUND OF THE INVENTION

In recent years, minute machines, termed micromachines, have been proposed which are several millimeters or smaller in size, and extensive research is under way to develop such machines for actual use.

The drive systems already known for use with such micromachines include a wired system having a cable for feeding therethrough energy (electric power) and control signals from outside to a machine unit having an actuator as shown in FIG. 15A, and a wireless system for wirelessly feeding only control signals from outside to a machine unit which is internally provided with a battery or like energy source as seen in FIG. 15B.

In the case of the wired system, the energy source is provided outside the machine unit, so that the system has the advantages that the unit itself can be made smaller and that the micromachine can be designed with greater freedom since the amount of drive energy is not limited. However, the cable indispensable for the supply of energy imposes limitations on the operation range of the machine unit and on the movement thereof.

In the case of the wireless system, the machine unit is movable without limitations, whereas the need to mount the energy source on the machine unit for driving the unit increases the size and weight of the entire micromachine to impair the contemplated function of the micromachine.

An electrostatic motor has been proposed as a power generating mechanism for micromachines having the wired system. This motor comprises a rotor and a stator which are prepared from silicon or like semiconductor by photolithographic techniques. The rotor is rotatable by an electrostatic force acting between the rotor and the stator (see Journal of Japan Robot Society, Vol. 8, No. 4, August 1990, pp. 63-68).

However, the electrostatic motor has the problem of necessitating a complex peripheral circuit since the polarity of voltage to be applied to the blades of the rotor is alternately changed to positive and negative to realize continuous rotation.

Furthermore, the electrostatic force in the electrostatic motor is dependent on a point-to-point Coulomb's force generated by a charge at the outer end of the rotor blade and a charge at the outer end of the stator blade. This necessitates use of a high voltage of at least 100 V to obtain a great drive force. The voltage to be applied is high relative to the small size of the electrostatic motor which is about 200 micrometers in the diameter of the rotor and 2 to 3 micrometers in the distance between the rotor and the stator. Special consideration must therefore be given to space apart the rotor and the stator, and the adjacent blades of the stator against pressure.

Another problem is also encountered in that the peripheral circuit needs to be large-sized for controlling the high voltage of at least 100 V to be applied.

SUMMARY OF THE INVENTION

An object of the present invention is to provide an electrostatic motor which is useful as a power generating mechanism for micromachines and to which energy can be supplied wirelessly from outside.

Another object of the invention is to provide an electrostatic motor which itself is simple in construction and which permits use of a simplified peripheral circuit therefor.

The present invention provides an electrostatic motor comprising a semiconductor substrate rotatable around a central axis thereof, and at least one drive electrode disposed at a specified position in proximity to the substrate, the semiconductor substrate having electromagnetic wave-static electricity converters each comprising a p-n junction and individually provided at a plurality of portions around the substrate axis. The drive electrode is opposed to a path through which electromagnetic wave irradiation regions formed on the respective converters move with the rotation of the substrate, an electromagnetic wave traveling channel being provided at one side of the drive electrode and extending to the irradiation region of the converter adjacent to another one of the converters opposed to the drive electrode.

When the irradiation region of the electromagnetic wave-static electricity converter on the semiconductor substrate is irradiated with an electromagnetic wave through the channel, the converter starts to generate electricity to produce a positive charge on the surface of the region. On the other hand, a positive or negative charge is supplied to the drive electrode. Consequently, an electrostatic force is produced between the drive electrode and the converter, acting in attraction or repulsion on the semiconductor substrate and causing the substrate to start to rotate.

With the electrostatic motor described above, the semiconductor substrate is rotatable merely by supplying a positive or negative charge to the electrode and projecting sunlight or like electromagnetic waves on the converters of the substrate without the necessity of applying a high voltage to the electrode. This greatly simplifies the motor and the peripheral circuit therefor in construction.

The present invention provides another electrostatic motor comprising a rotor made of a semiconductor substrate and rotatable around a central axis thereof, and a stator made of a semiconductor substrate and disposed at a specified position coaxially with the axis of the rotor. Each of the rotor and the stator has a plurality of blades extending radially thereof and orthogonal to the axis. The blades of the rotor are opposed to the blades of the stator axially of the axis in overlapping relation with a small distance provided therebetween. Each of these blades is formed with an electromagnetic wave-static electricity converter of a p-n junction to make the opposed surfaces of the rotor blade and the stator blade opposite in polarity.

When the converters of the rotor and the stator are irradiated with an electromagnetic wave from one direction along the axis of the rotor, the electromagnetic wave generates a positive charge on the irradiated surfaces of the rotor and stator blades and a negative charge on the rear surfaces thereof, consequently producing an electrostatic force between the opposed surfaces of the rotor and the stator to thereby initiate rotation of the rotor.

With the electrostatic motor described above, the rotor can be rotated merely by irradiating the rotor and the stator with sunlight or like electromagnetic radiation. This not only simplifies the construction of the motor and the peripheral circuit therefor but also makes it possible to supply the motor driving energy completely wirelessly.

When used as a power generating source for micromachines, therefore, the electrostatic motor renders the micromachine movable with increased freedom and usable for wider application.

Another object of the invention is to provide a micromachine which has a wireless system and to which drive energy can be supplied wirelessly from outside without the necessity of mounting any energy source on its machine unit.

Still another object of the invention is to provide a micromachine which has a plurality of functions and which is adapted to selectively perform at least one of the functions by changing the frequency of electromagnetic wave to be supplied as an energy source.

The present invention provides a micromachine which comprises a machine unit having a plurality of functional means, and a plurality of electromagnetic wave-static electricity converters provided on the surface of the machine unit for supplying electric power to the respective functional means. The converters each have particular wavelength selecting characteristics sensitive to one of different electromagnetic waves, at least one of the functional means being selectively operable by selecting the wavelength of the electromagnetic wave to be supplied to the corresponding converter. The plurality of functional means include actuators for moving the machine unit in different directions.

With the micromachine described above, driving energy can be supplied in the form of electromagnetic waves, and at least one of the functions can be selectively performed with the corresponding one of the electromagnetic waves which are different in frequency. The micromachine can therefore be made not only small-sized and lightweight in its entirety but also multifunctional.

Further if the above electrostatic motor of the invention is used for the micromachine as its power generating mechanism, the simplified construction of the motor and the peripheral circuit thereof serves to make the micromachine more small-sized and lightweight.

DETAILED DESCRIPTION OF THE PREFERRED EMBODIMENTS

Embodiments of Electrostatic Motor

Figure 1:
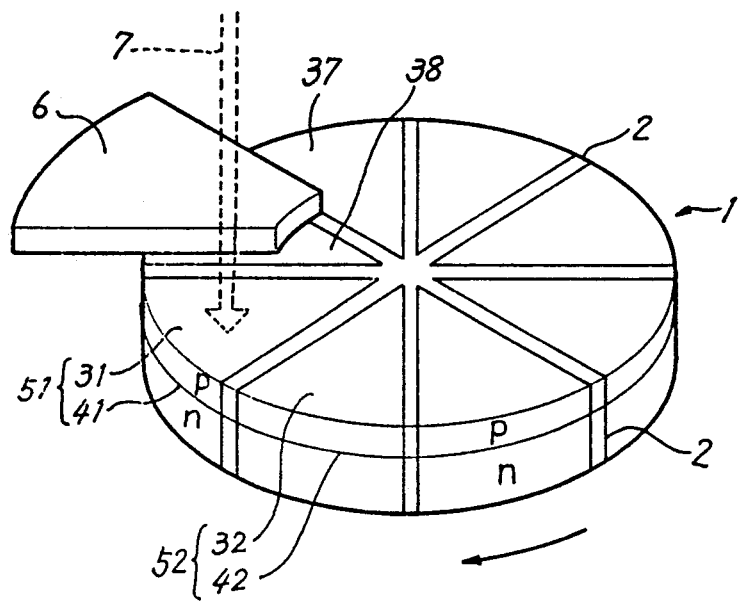
FIG. 1 is a perspective view showing a first embodiment of electrostatic motor for use in a micromachine of the present invention.

FIG. 1 shows an electrostatic motor of the present invention which comprises a disklike substrate 1 made of silicon or like semiconductor material and serving as a rotor. The substrate 1 is rotatably supported by unillustrated bearing means. The semiconductor substrate 1 is about 20 to about 200 micrometers in diameter and about 1 to several micrometers in thickness. Radial separating zones 2 are formed in the substrate 1, for example, by oxygen ion implantation to thereby electrically separate the substrate 1 into a multiplicity of regions 31, 32, ..., 38.

These multiplicity of regions 31, 32, ..., 38 are doped with boron, phosphor or like impurity element from the surface to form p-n junctions 41, 42, ... These p-n junctions 41, 42, ... provide electromagnetic wave-static electricity converters 51, 52, ... which are typically solar cells and which generate electricity when irradiated with sunlight or like electromagnetic wave.

Disposed above the surface of the semiconductor substrate 1 is a drive electrode 6 opposed to the divided region of the substrate 1 and in the form of a sector corresponding to the region. A positive or negative charge is applied to the drive electrode 6.

As seen in FIG. 1, the substrate 1 is made p-type on the front side and n-type on the rear side. Sunlight 7 is projected on the substrate region 31 adjacent to the substrate region 38 opposed to the drive electrode 6, with the electrode negatively charged.

Consequently, the converter 51 in the region 31 irradiated with the sunlight 7 starts to generate electricity, producing a positive charge on the surface of the region 31. As a result, an electrostatic force is produced between the positive charge and the negative charge on the drive electrode 6 to act as attraction between the substrate region 31 and the drive electrode 6, causing the substrate 1 to start clockwise rotation.

When the region 31 enters the shadow of the electrode 6 with the rotation, the electrostatic force between the region 31 and the electrode 6 fades away, whereas the adjacent substrate region 32 becomes irradiated with the sunlight 7, which in turn produces an electrostatic force between the region 32 and the electrode 6, with the result that the substrate 1 is driven continuously.

Conversely, if the drive electrode 6 is positively charged, repulsion occurs between the positive charge on the surface of the region 31 irradiated with the sunlight and the positive charge on the electrode 6 to rotate the substrate 1 counterclockwise.

Figure 2:
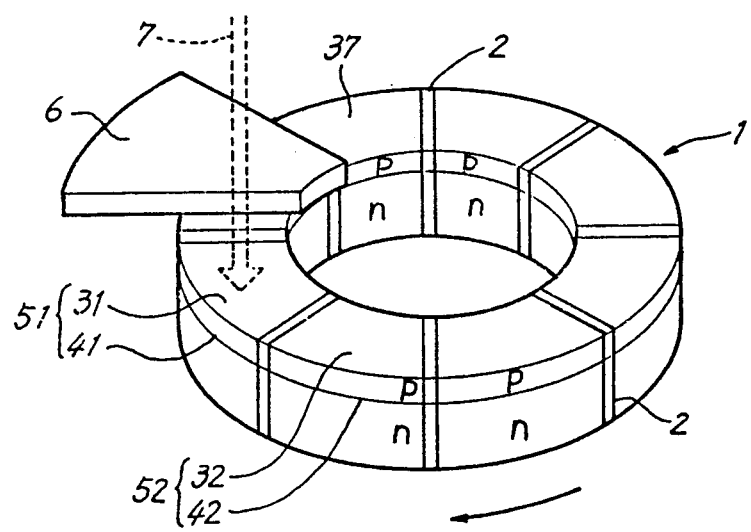
FIG. 2 is a perspective view showing a second embodiment of electrostatic motor.

FIG. 2 shows another electrostatic motor, which differs from the first embodiment in that the semiconductor substrate 1 is in the form of a ring. The central portion of the substrate 1 not contributing to rotation is thus removed, whereby the weight of the semiconductor substrate as a rotor is reduced to afford an increased torque per unit weight.

Figure 3:
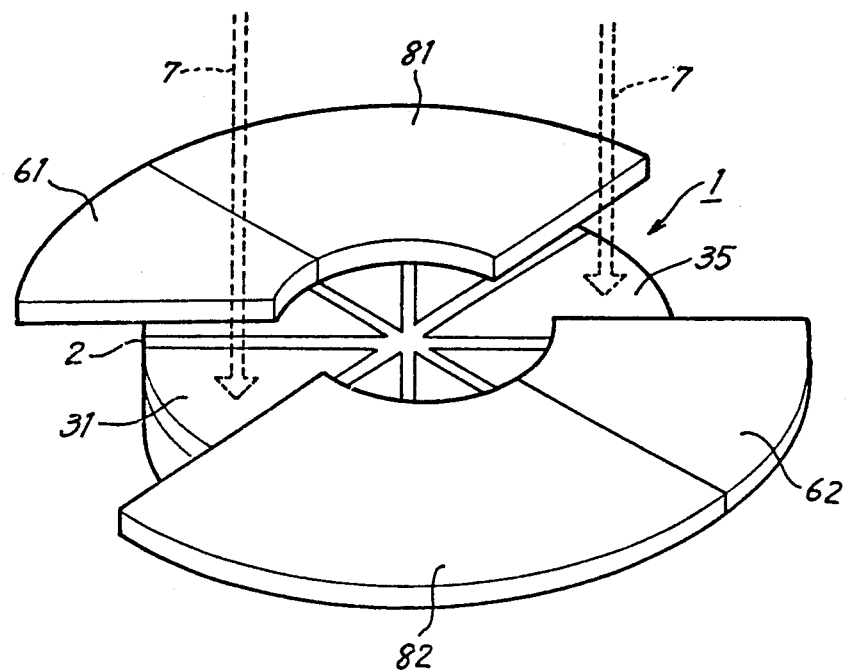
FIG. 3 is a perspective view showing a third embodiment of electrostatic motor.

FIG. 3 shows another electrostatic motor which is an improvement over the embodiments of FIGS. 1 and 2. The motor includes a plurality of drive electrodes 61, 62 to give a greater rotational drive force. A light blocking plate 81 or 82 for blocking sunlight 7 is provided at one side of each of the drive electrodes 61, 62, and an opening is formed at the other side of each electrode for passing the sunlight 7 therethrough.

When the entire exposed surface of the semiconductor substrate 1 is irradiated with the sunlight 7, the sunlight 7 passing through the openings impinges on the exposed regions 31, 35 of the substrate 1, producing an electrostatic force between the regions 31, 35 and the electrodes 61, 62 to drivingly rotate the substrate 1.

With the above embodiment, a rotational drive force is available at a plurality of portions of the semiconductor substrate 1, so that the combined drive force is greater than the force available with the embodiments of FIGS. 1 and 2.

Figure 4:
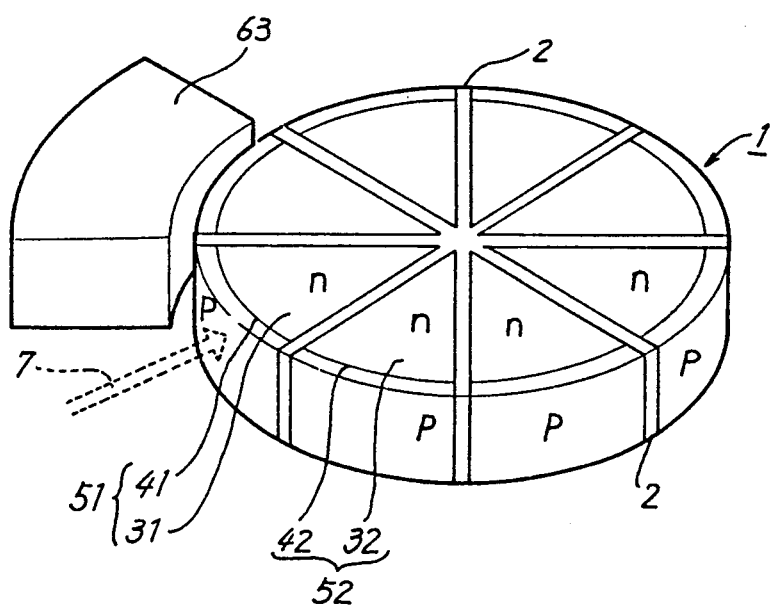
FIG. 4 is a perspective view showing a fourth embodiment of electrostatic motor.

FIG. 4 shows another electrostatic motor wherein the semiconductor substrate 1 is radially doped with an impurity element to provide p-n junctions 41, 42, . . . forming a cylinder parallel to the outer periphery of the substrate 1. A drive electrode 63 is disposed as opposed to the outer surface of one of the regions of the substrate 1. Sunlight 7 is projected on the outer surface of one region 31 of the substrate 1. Consequently, attraction repulsion is generated between the charge produced on the outer surface of the substrate region 31 and the charge applied to the drive electrode 63 to drivingly rotate the substrate 1 clockwise or counterclockwise.

Figure 5:
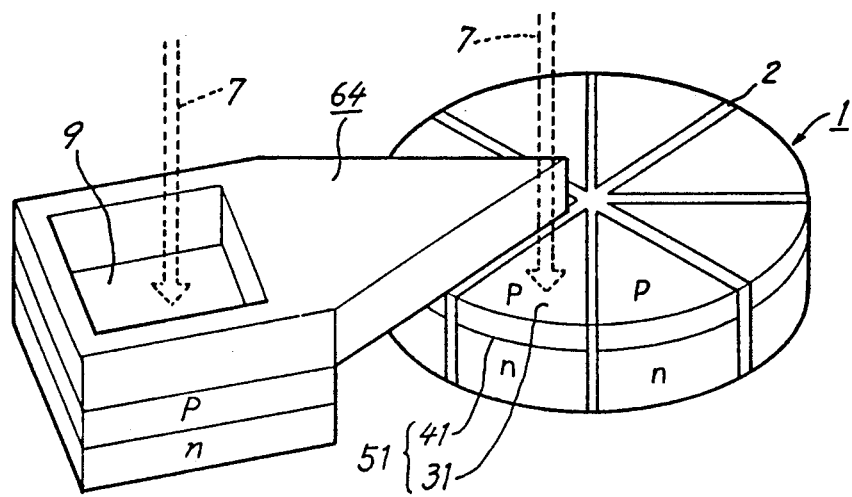
FIG. 5 is a perspective view showing a fifth embodiment of electrostatic motor.

With each of the first to fourth embodiments, the drive electrode is charged from outside the motor, whereas FIG. 5 shows an electrostatic motor having a drive electrode 64 which is charged by an electromagnetic wave-static electricity converter 9 as a component of the motor. More specifically, the converter 9 comprises a p-n junction and is electrically connected to the drive electrode 64. One of the regions 31, of the semiconductor substrate 1 and the converter 9 are irradiated with sunlight 7.

This produces repulsion or attraction between a charge generated by the converter 9 and led to the drive electrode 64 and a charge generated by the converter 51 of the semiconductor substrate 1, thereby drivingly rotating the substrate 1.

With the above electrostatic motor, the energy for the drive electrode 64 is afforded also by the sunlight. Therefore, the motor can be made wireless in its entirety.

Figure 6:
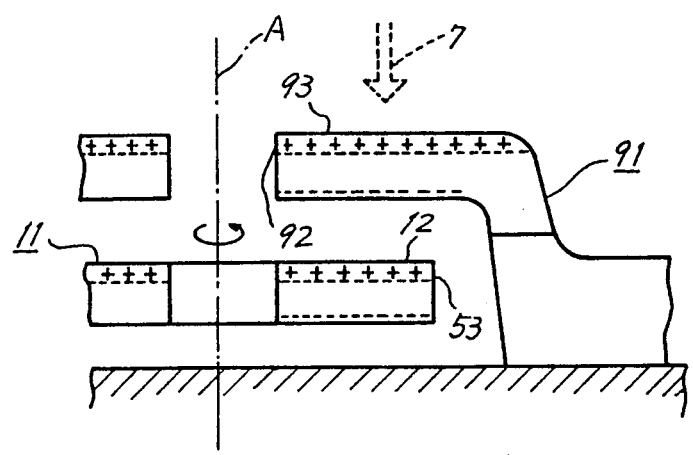
FIG. 6 is a fragmentary view in vertical section showing a sixth embodiment of electrostatic motor.
Figure 7:
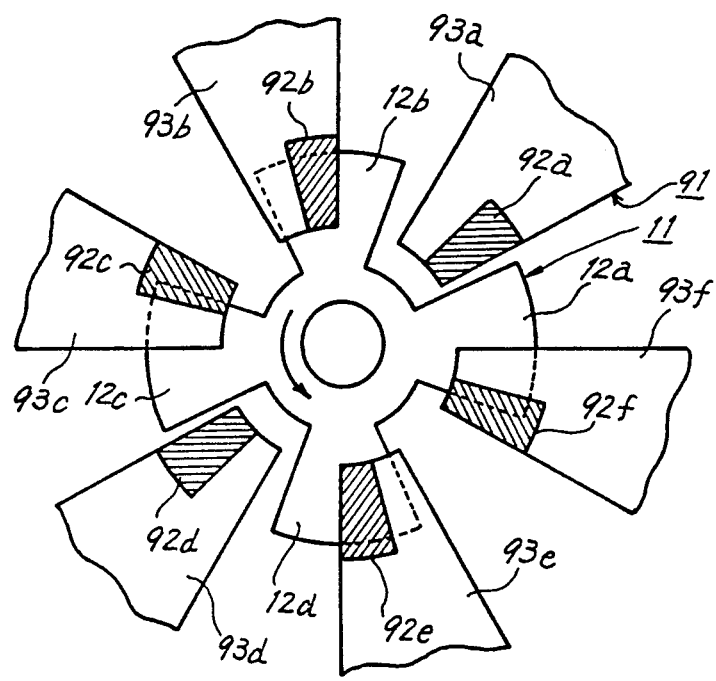
FIG. 7 is a fragmentary plan view showing the sixth embodiment.

FIGS. 6 and 7 show an electrostatic motor which comprises a rotor 11 and a stator 91. The rotor 11 is rotatably supported at a specified level on a rotary axis A by unillustrated bearing means.

Each of the rotor 11 and the stator 91 is prepared from a semiconductor silicon substrate as its base by a known technique such as photolithography, CVD or etching. The rotor 11 is about 200 micrometers in diameter, the axial distance between the rotor 11 and the stator 91 is 1 to 2 micrometers, and the rotor 11 and the stator 91 are each about 1 micrometer in thickness.

First, the motor is characterized in that the rotor 11 has a plurality of blades 12 extending to below a plurality of blades 93 of the stator 91 in face-to-face opposed relation with the blades 93. This provides a sufficient rotational drive force.

The blades 12 of the rotor 11 each have a front surface doped with an impurity element to form an electromagnetic wave-static electricity converter 53 comprising a p-n junction. The blades 93 of the stator 91 each have a front surface also doped with an impurity element to provide an electromagnetic wave-static electricity converter 92 comprising a p-n junction.

Accordingly, when the blades 12, 93 of the rotor 11 and the stator 91 are irradiated with sunlight 7 over their front surfaces, the blades are positively charged over the front surfaces and negagively charged over the rear surfaces, producing an electrostatic force between the face-to-face opposed regions of the rotor 11 and the stator 91.

Second, the electrostatic motor is further characterized in that as seen in FIG. 7, the converters 92a, 92b, 92c, 92d, 92e, 92f on the blades 93a, 93b, 93c, 93d, 93e, 93f of the stator 91 are each formed only in one side region (indicated by hatching) of the free end of the blade with respect to the circumferential direction, with the other side portion thereof having solely the function of blocking the sunlight, whereby the rotational drive force on the rotor 11 is caused to act only in one direction for the rotor 11 to rotate in one direction.

In the state of FIG. 7, a positive charge occurs on the irradiated region included in the surface region of the blade 12a of the rotor and not covered with the blade 93f of the stator 91. On the other hand, a negative charge occurs on the rear surface of the converter 92a of the stator blade 93a. Consequently, attraction acts between the positive charge and the negative charge, exerting a counterclockwise rotational force on the blade 12a of the rotor 11.

Further attraction acts between a positive charge generated on the irradiated region of the blade 12b of the rotor 11 and a negative charge produced on the rear surface of the converter 92b of the stator 91 to exert a counterclockwise rotational force on the rotor blade 12b.

Furthermore, attraction acts between a positive charge on the rotor blade 12c and a positive charge of the stator converter 92d, and attraction acts between a positive charge on the rotor blade 12d and a negative charge of the stator converter 92e.

Even when the rotor 11 rotates to a position different from that shown in FIG. 7, the motor exhibits the same directionality of attraction described above due to the position relationship of the converter regions formed on the stator blades with the light blocking regions thereof. As a result, the counterclockwise force always acts on all the blades 12a, 12b, 12c, 12d, 12e, 12f of the rotor 11 regardless of the angle of rotation, causing the rotor 11 to continuously rotate counterclockwise.

The electrostatic force acting between the rotor 11 and the stator 91 will now be considered.

Figure 8:
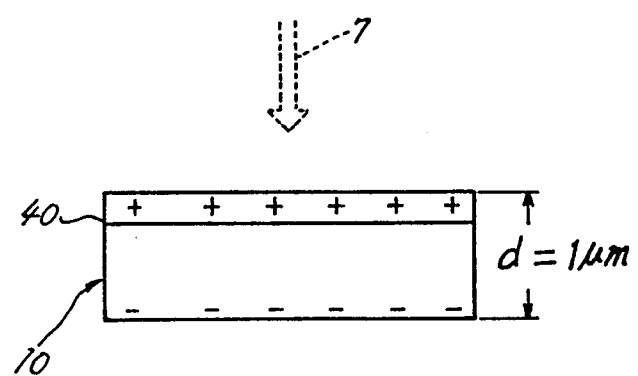
FIG. 8 is a diagram for use as a reference in calculating the amount of charges in the electrostatic motor.

FIG. 8 shows a single-crystal silicon substrate 10 having a thickness of 1 micrometer and formed with a p-n junction 40 providing an electromagnetic wave-static electricity converter. When the silicon substrate 10 is irradiated with sunlight 7, positive and negative charges occur on the respective surfaces of the substrate. If the silicon substrate is regarded as a dielectric body of a capacitance $C_0$, an open-circuit voltage V occurs across the front and rear surfaces of the substrate, with the converter in an unloaded state. Accordingly, suppose S stands for the surface area of the substrate $\epsilon_0$ is the dielectric constant in a vacuum, $\epsilon_{si}$ is the specific dielectric constant and d is the thickness of the substrate as shown in FIG. 8. The amount of charges Q is then expressed by the following equation.

$$Q = C_0 V = \frac{\epsilon_0 \epsilon_{si} S}{d} \cdot V$$

Figure 9:
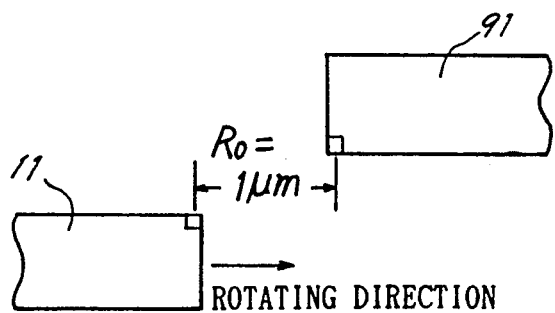
FIG. 9 is a diagram for use as a reference in calculating electrostatic attraction in the electrostatic motor.

Now regarding the charges on the rotor 11 and the stator 91 as point charges as shown in FIG. 9 and substituting the following values in the above equation
S=1 μm²
$\epsilon_0 = 8.854 \times 10^{-12}$ F/m
$\epsilon_{si} = 12$ (in the case of silicon)
V=0.6 V (electromotive force of single-crystal silicon solar cell)
d=1 μm
the amount of charges Q is given by $$Q = \frac{8.855 \times 10^{-12} \times 12 \times 10^{-12}}{1 \times 10^{-4}} \cdot 0.6$$
$$= 6.4 \times 10^{-17} (C)$$

Further in the case where the amount of charges $Q_1$ on the rotor 11 and the amount of charges $Q_2$ on the stator 91 are each set to the above amount of charges Q, and the radial distance between the rotor 11 and the stator 91 is set to a representative value $R_0$ of 1 μm as shown in FIG. 9, the electrostatic attraction F is given by the following equation.

$$F = \frac{Q_1 Q_2}{4 \pi \epsilon_0 R^2} = 9 \times 10^9 \times \frac{(6.4 \times 10^{-17})^2}{(1 \times 10^{-4})^2}$$
$$= 3.68 \times 10^{-11} (N)$$

Accordingly, when the rotor 11 typically has a radius r of 100 μm, the torque T acting on one blade of the rotor 11 is calculated from the following equation.

$$T = F \cdot r = 3.68 \times 10^{-15} (N \cdot m)$$

The rotor 11 is rotated by the total value of the torques T acting on all the blades of the rotor 11, and the combined torque is supplied to the contemplated actuator on the machine unit.

Although the rotor 11 and the stator 91 are shown as having four poles and six poles, respectively, in FIG. 7 for a simplified description, the number of such poles is of course variable as desired.

According to the foregoing embodiments of electrostatic motors, the electromagnetic wave-static electricity converters are to be irradiated with sunlight which is readily available abundantly, whereas the electromagnetic radiation to be used is not limited to sunlight but various electromagnetic waves are usable which range, for example, from light of short-wavelength ultraviolet region to light of long-wavelength infrared region.

Further with use of converged laser beams having a high energy density per unit area, the electrostatic motor will provide a great torque.

According to the foregoing embodiments of electrostatic motors, a rotatable semiconductor substrate is formed with electromagnetic wave-static electricity converters, which are irradiated with electromagnetic radiation, so that not only the motor but also the peripheral circuit therefor is simplified. The motor is therefore very useful for micromachines as the power generating source.

Especially in the case of the embodiments shown in FIGS. 5 to 7, the motor driving energy can be supplied completely wirelessly. This makes micromachines movable with increased freedom and usable for wider application.

Embodiments of Micromachines

Figure 10:
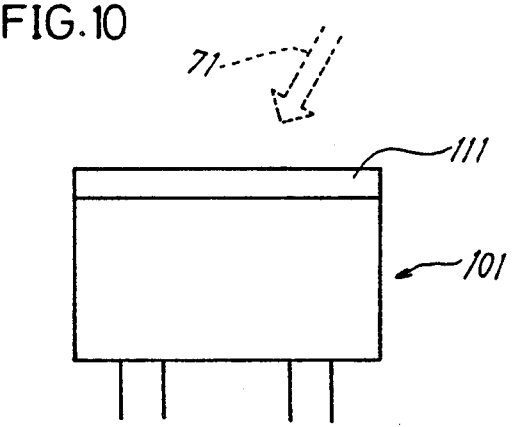
FIG. 10 is a diagram showing a first embodiment of micromachine of the invention.

FIG. 10 shows a micromachine which comprises a machine unit 101, and an electromagnetic wave-static electricity converter 111 provided over the surface of the machine unit 101 or receiving electromagnetic wave 71 and converting the electromagnetic wave to electric energy, which is used for moving the machine unit 101 itself or driving various actuators (not shown) mounted thereon for different purposes. These actuators include, for example, a pump mechanism for forcing out a medicinal.

Sunlight is useful as the radiation 71 but is not very high in energy density per unit area, so that if greater energy is required, a converged laser beam or the like is usable which has a high energy density per unit area.

In addition to the sunlight and laser beam, also useful as the electromagnetic wave 71 are X-rays of about $10^{-9}$ m in wavelength and the electromagnetic wave of ultraviolet region through unfrared region of about $10^{-5}$ m in wavelength. Advantageously usable with the electromagnetic wave of short-wavelength ultraviolet region is a solar cell serving as the converter 111 and prepared from a material of wide band gap, such as amorphous silicon (a-Si) or gallium arsenide (GaAs). Solar cells fabricated, for example, from single-crystal Si are advantageously usable with visible light. Suitable for use with infrared rays are solar cells prepared from a material of narrow band gap, such as germanium, since these cells exhibit high sensitivity to the rays.

Even in the case where a common solar cell sensitive to a considerably wide range of wavelengths is used instead of the electromagnetic wave-electricity converter having characteristics suitable for the electromagnetic wave of specified wavelength, the solar can be given a sharp sensitivity to the electromagnetic wave of specified wavelength when the entire surface of the cell is provided with a filter for passing therethrough the particular wave only.

A drive system will also be useful which is adapted to convert electromagnetic wave from outside to electrical energy, store the converted energy and consume the energy upon the level of the stored energy exceeding a predetermined value. In this case, the converter 111 generates electricity at all times from the sunlight or like radiation 71 received, and the generated power is stored in a capacitor or the like, which releases the energy for driving the actuator when an amount of energy has been stored.

Figure 11:
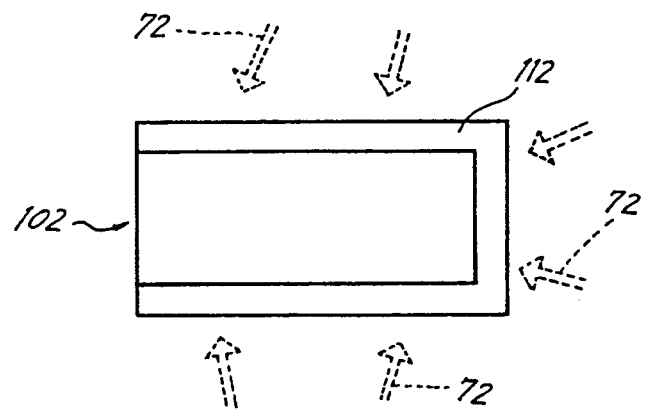
FIG. 11 is a diagram showing a second embodiment of micromachine.

FIG. 11 shows another embodiment of micromachine, which comprises a machine unit 102 and an electromagnetic wave-static electricity converter 112 surrounding the unit 102.

The micromachine is placed into the blood vessel of the human body and brought to an affected part by the flow of blood. The micromachine has the function of internally observing the affected part and transmitting the result of observation to the outside of the body, or applying a machine to the affected part by operating a pump incorporated in its machine unit in response to a command given from outside the body upon reaching the affected part.

The electromagnetic wave-electricity converter 112 is prepared chiefly from a pyroelectric material such as $LiTaO_3$ or $PbTiO_3$ and is capable of generating the required power from infrared radiation 72 received over the wide surface area thereof from the human body and about 4 to about 10 micrometers in wavelength.

The converter 112 need not always be prepared from the pyroelectric material but can be a photoelectric converter fabricated, for example, from a semiconductor of very small band gap, such as InSb (0.17 eV in band gap), PbSe (0.17 eV in band gap) or PbTe (0.19 eV in band gap).

Figure 12:
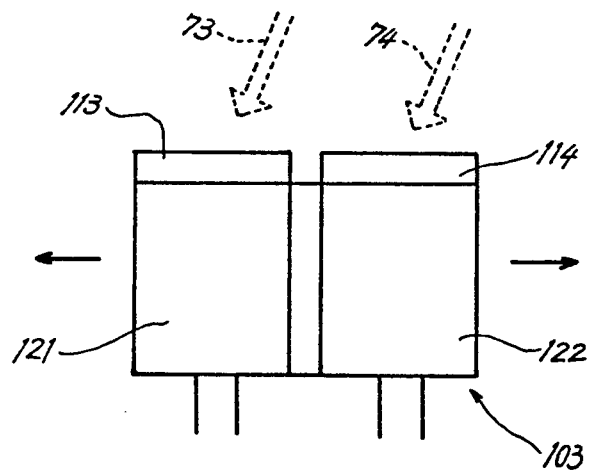
FIG. 12 is a diagram showing a third embodiment of micromachine.

FIG. 12 shows another micromachine, which comprises a machine unit 103, and first and second actuators 121, 122 mounted on the unit 103 and operable to move the unit in opposite directions. The machine unit has first and second electromagnetic wave-static electricity converters 113, 114 for supplying electric power to the actuators 121, 122, respectively.

These converters 113, 114 are sensitive to radiations of different wavelengths. For example, usable as the first converter 113 is a solar cell fabricated from a-Si, GaAs, Ge or single-crystal Si and provided over the front surface thereof with a filter having a peak sensitivity to red light of about 650 nm in wavelength, and as the second converter 114 is the same solar cell as above which is provided over the front surface thereof with a filter having a peak sensitivity to blue light of about 450 nm in wavelength.

In this case, the first converter 113 only operates for power generation when the micromachine is irradiated with red light 73, whereby the first actuator 121 is driven to move the micromachine, for example, leftward. On the other hand, when the micromachine is irradiated with blue light 74, the second converter 114 only operates for power generation, whereby the second actuator 122 is driven to move the micromachine in an opposite direction, i.e., rightward.

Besides the monochromatic light such as red light or blue light, light of mixed two colors is usable to drive the actuators at the same time, with the ratio between the intensities of two light components of different colors varied, whereby the micromachine can be moved forward, rearward, rightward, leftward or in any other direction as desired.

Figure 13:
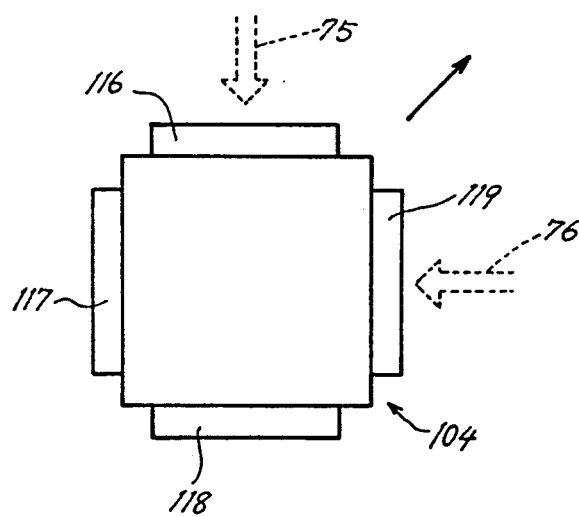
FIG. 13 is a diagram showing a fourth embodiment of micromachine.

FIG. 13 shows another micromachine, which is an improvement over the micromachine of FIG. 12 and has a machine unit 104. The unit is rectangular parallelopipedal and has electromagnetic wave-static electricity converters 116, 117, 118, 119 provided on the respective sides and each comprising a solar cell or the like. The direction of movement of the machine unit is controllable by irradiating the converters with light under varying conditions.

For example, when the converter 116 on the top side of the machine unit is irradiated with light 75, the micromachine moves upward along the direction of projection of the light. If the converter 119 on the right side of the machine unit is irradiated with light 76, the micromachine moves rightward. Further if both the converters 116 and 119 are irradiated with the light 75 and the light 76 with the same intensity at the same time, the micromachine moves obliquely rightwardly upward at an angle of 45 degrees as indicated in the solid-line arrow shown.

As described above, the micromachine shown in FIG. 12 or 13 has a plurality of electromagnetic wave-static electricity converters which are sensitive to waves of different wavelengths, so that the micromachine is movable in two or more controlled directions by selecting the radiation to be used. Moreover, the system for controlling the direction of movement can be disposed outside the micromachine. This simplifies the construction of the micromachine itself.

Electromagnetic motors utilizing a magnetic force are generally used as power sources for movement, while the torque of the electromagnetic motor is considered to be proportional to the third power of the size of the motor itself. Accordingly, use of electromagnetic motors for micromachines which are of the order of several millimeters is likely result in an insufficient torque.

On the other hand, the torque of the electrostatic motor utilzing an electrostatic force is in proportion to the square of the size of the motor, so that it is desirable to use electrostatic motors for micromachines as the power sources therefor. In this case, use of the electrostatic motors shown in FIGS. 1 to 7 realizes multifunctional micromachines with a simplified construction.

Advantageously usable as actuators of micromachines are bimorphs prepared from polyvinylidene fluoride, $LiTaO_3$, $PbTiO_3$ or like ferroelectric substance.

The micromachine shown in FIG. 12 or 13 is movable in controlled directions by varying the wavelength of the electromagnetic wave to be applied or the direction of application, while in addition to the movement of the micromachine itself, the functions to be performed by the micromachine, such as the operation to detect temperature, pressure, humidity, etc., transmission of the result of detection to the outside of the micromachine and application of medicinals at a specified position, are also controllable according to the wavelength of electromagnetic wave to be used and the direction of projection of the wave.

When the micromachine is thus constructed, the functions thereof are controllable from outside the machine unit. This contributes a great deal to improvements in the functions of the micromachine which needs to be compacted to the greatest possible extent.

Figure 14:
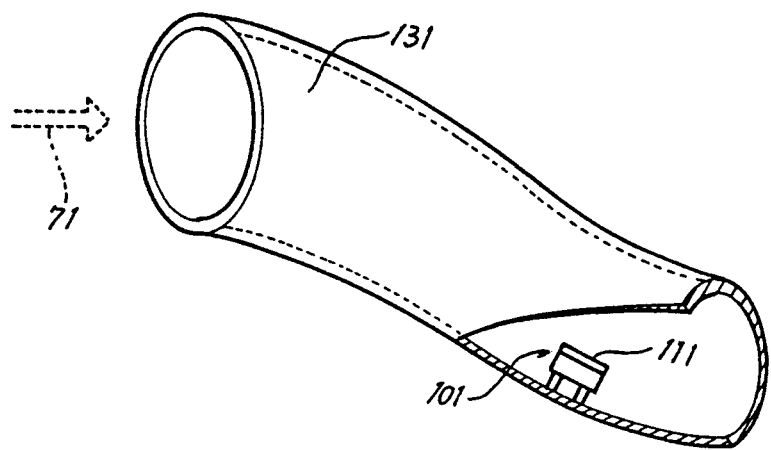
FIG. 14 is a perspective view partly broken away and showing the micromachine as inserted in a pipe for operation.
Figure 15A:
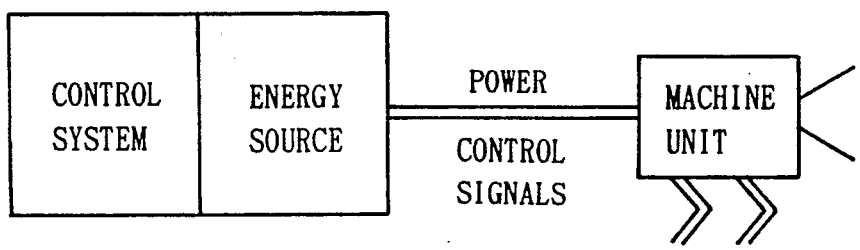
FIGS. 15A and 15B are diagrams illustrating the concept of conventional micromachines.
Figure 15B:
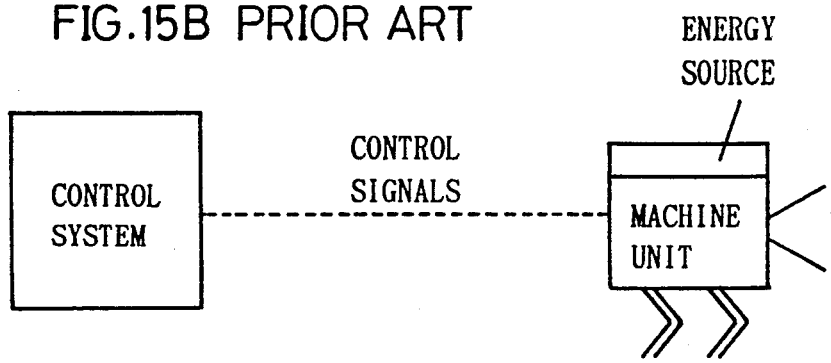

FIG. 14 shows the micromachine as placed in a pipe 131 which has a mirror-finished inner surface. It is seen that light 71 is projected into the pipe through an opening at one end of the pipe to supply energy to the micromachine. The projected light 71 impinges on the electromagnetic wave-static electricity converter 111 on the machine unit 101 while being reflected at the pipe inner surface to generate a driving power. In this case, the projected light is propagated while being reflected at the pipe inner surface. The energy can therefore be supplied to the micromachine which is positioned at a large distance from the pipe end.

In the case where the pipe 131 is made of metal, microwaves several GHz to 10 GHz in frequency can be introduced into the pipe instead of the light, with a Gunn diode or like microwave receiver mounted on the machine unit to supply energy to the micromachine. The combination of microwaves and the Gunn diode will be an effective method of supplying energy since the Gunn diode achieves a very high energy conversion efficiency of about 50%.

The foregoing system for wirelessly supplying energy to the micromachine as placed within the pipe is applicable to micromachines, for example, for use in detecting flaws in the piping in nuclear power plants or tankers.

Incidentally, the amount of energy to be stored in common existing batteries is known to be in proportion to the third power of the size of the battery. Accordingly, the amount of energy to be stored in batteries which are mountable on micromachines is inevitably very small.

On the other hand, with the system wherein the combination of electromagnetic wave and electromagnetic wave-static electricity converter is employed for supplying energy, the amount of energy which can be supplied is in proportion to the square of the surface area of the converter. The system is therefore well-suited for micromachines which must be extremely small.

Whereas the battery is indispensable for the conventional micromachines of the wireless type, the present micromachine need not be provided with any battery and can therefore be compacted and made lightweight.

Especially in the case of the micromachine having a plurality of actuators which are controllable for operation by electromagnetic waves of different wavelength as described in the above, various operation can be realized merely by changing the wavelength of electromagnetic wave from outside. Accordingly, the micromachine can be rendered compacted, lightweight and also multifunctional.

The foregoing embodiments are given to illustrate the present invention and should not be construed as restricting the invention defined in the appended claims or reducing the scope thereof. Further the construction of the devices of the invention is not limited to those of the foregoing embodiments but can of course be modified variously by one skilled in the art without departing from the spirit of the invention.

What is claimed is:

1. An electrostatic motor, comprising:
   a semiconductor substrate rotatable around a central axis thereof; and
   at least one drive electrode disposed at a specified position in proximity to said semiconductor substrate;
   said semiconductor substrate having electromagnetic wave-static electricity converters each comprising a p-n junction, said converters being individually disposed at a plurality of angularly-spaced portions around said substrate axis, said drive electrode being opposed to a path through which electromagnetic wave irradiation regions formed on the respective converters move with the rotation of said substrate; an electromagnetic wave traveling channel being disposed at one side of said drive electrode and extending to said irradiation region of said converter adjacent to another one of said converters opposed to said drive electrode, said semiconductor substrate being rotatable by an electrostatic force between a surface portion of said drive electrode and an adjacent surface portion of said converter irradiated with electromagnetic wave through said channel.

2. An electrostatic motor as defined in claim 1 wherein said semiconductor substrate is in the form of a disk and is formed with separating zones extending radially from said substrate axis to provide a plurality of sectorial electromagnetic wave-static electricity converters.

3. An electrostatic motor as defined in claim 1 wherein said substrate has a first surface exposed to impingement of the electromagnetic wave, said first surface of said substrate containing said adjacent surface portion, said first surface of said substrate being doped with an impurity element from a direction along the rotational axis of said substrate to form a p-n junction in parallel to said substrate surface and thereby form said converters.

4. An electrostatic motor as defined in claim 1 wherein said substrate has an outer peripheral surface doped with an impurity element from a direction orthogonal to said substrate axis to form a p-n junction in parallel to the outer peripheral surface of said substrate and thereby provide said converters.

5. An electrostatic motor as defined in claim 1 wherein said drive electrode has electrically connected thereto an electromagnetic wave-static electricity converter to be irradiated with electromagnetic wave simultaneously with the irradiation of said substrate with said electromagnetic wave, said drive electrode being chargeable by said converter connected thereto.

6. An electrostatic motor comprising a rotor made of a said semiconductor substrate and rotatable around a central axis thereof, and a stator made of a said semiconductor substrate and disposed at a specified position coaxially with said axis of said rotor, each of said rotor and said stator having a plurality of blades extending radially thereof and orthogonal to said axis, said blades of said rotor being opposed to said blades of said stator axially of said axis in lapping relation with a small distance provided therebetween, each of said blades being formed with an electromagnetic wave-static electricity converter of p-n junction to make opposed surfaces of said rotor blade and said stator blade opposite in polarity, said rotor being rotatable with an electrostatic force produced between said opposed blades by irradiating said converters of said rotor and said stator with electromagnetic wave from one direction along said axis.

7. An electrostatic motor as defined in claim 6 wherein said rotor blades are different from said stator blades in number, and among said rotor blades and said stator blades, said blades positioned toward said direction or irradiation with said electromagnetic wave are each formed with said converter only in one side region thereof with respect to a circumferential direction about said rotor axis, said other side region thereof providing a radiation blocking portion.

8. An electrostatic motor as defined in claim 1, wherein said semiconductor substrate is in the form of a ring and is formed with separating zones extending radially from said substrate axis to provide a plurality of sectorial electromagnetic wave-static electricity converters.

9. An electrostatic motor, comprising:
   a semiconductor substrate rotatable around a central axis thereof; and
   at least one drive electrode disposed at a specified position in proximity to said semiconductor substrate;
   said semiconductor substrate having electromagnetic wave-static electricity converters each comprising a p-n junction in which a p-doped portion of said semiconductor substrate extends substantially orthogonally to the rotational axis of said semiconductor substrate in a first disk-shaped region thereof, and a p-doped portion of said semiconductor substrate extends substantially orthogonally to the rotational axis of said semiconductor substrate in a second disk-shaped region thereof, said converters being individually disposed at a plurality of angularly-spaced portions around said substrate axis, said drive electrode being opposed to a path through which electromagnetic wave irradiation regions formed on the respective converters move with the rotation of said substrate, an electromagnetic wave traveling channel being disposed at one side of said drive electrode and extending to said irradiation region of said converter adjacent to another one of said converters opposed to said drive electrode, said semiconductor substrate being rotatable by an electrostatic force between a surface portion of said drive electrode and an adjacent surface portion of said converter irradiated with electromagnetic wave through said channel.

10. An electrostatic motor as defined in claim 9, wherein said semiconductor substrate is in the form of a ring and is formed with separating zones extending radially from said substrate axis to provide a plurality of sectorial electromagnetic wave-static electricity converters.

11. An electrostatic motor as defined in claim 9, wherein said semiconductor substrate is in the form of a disc and is formed with separating zones extending radially from said substrate axis to provide a plurality of sectorial electromagnetic wave-static electricity converters.

12. An electrostatic motor, comprising:
 a semiconductor substrate rotatable around a central axis thereof; and
 at least one drive electrode disposed at a specified position in proximity to said semiconductor substrate;
 said semiconductor substrate having electromagnetic wave-static electricity converters each comprising a p-n junction in which one of a p-doped portion and an n-doped portion of said semiconductor substrate extends substantially orthogonally to the rotational axis of said semiconductor substrate in a first disk-shaped region thereof, and the other of the p-doped portion and the n-doped portion of said semiconductor substrate extends annularly about the rotational axis of said semiconductor substrate, said converters being individually disposed at a plurality of angularly-spaced portions around said substrate axis, said drive electrode being opposed to a path through which electromagnetic wave irradiation regions formed on the respective converters move with the rotation of said substrate, an electromagnetic wave traveling channel being disposed at one side of said drive electrode and extending to said irradiation region of said converter adjacent to another one of said converters opposed to said drive electrode, said semiconductor substrate being rotatable by an electrostatic force between a surface portion of said drive electrode and an adjacent surface portion of said converter irradiated with electromagnetic wave through said channel.

13. An electrostatic motor as defined in claim 12, wherein said semiconductor substrate is in the form of a ring and is formed with separating zones extending radially from said substrate axis to provide a plurality of sectorial electromagnetic wave-static electricity converters.

14. An electrostatic motor as defined in claim 12, wherein said semiconductor substrate is in the form of a disc and is formed with separating zones extending radially from said substrate axis to provide a plurality of sectorial electromagnetic wave-static electricity converters.

* * * * *